Patented July 19, 1949

2,476,829

UNITED STATES PATENT OFFICE 2,476,829

STABILIZATION OF CHLORINE CONTAINING RESINS

Claire D. Le Claire, Akron, Ohio, assignor to The Firestone Tire & Rubber Company, Akron, Ohio, a corporation of Ohio No Drawing. Application October 18, 1946, Serial No. 704,297

9 Claims. (Cl. 260—45.85)

This invention relates to the stabilization, against light-aging, of chlorine containing resins in general, and in some of its more particular aspects, to the stabilization of chlorinated, hydrochlorinated, and chlorinated-hydrochlorinated natural and synthetic rubbers.

The chlorine containing resins, such as chlorinated rubber, vinyl chloride resins and the like, are cheaply and abundantly available, and may be formulated to yield products having the desirable features of strength, toughness, flexibility, chemical and solvent resistance, etc., which have led to their wide commercial acceptance. Unfortunately, by reason of their chlorine content, these resins all share a common defect, namely a tendency to "age," i. e., to become brittle and discolor, when exposed to light. This is particularly unfortunate in connection with chlorinated, hydrochlorinated, and chlorinated-hydrochlorinated rubber, since these particular resins are readily soluble in cheap solvents and have other properties adapting them for use as protective coatings, films, etc., in which applications the conditions of exposure are usually rather severe.

Various materials or "stabilizers" have been added to the chlorine containing resins in attempts, varying in the degree of their success, to protect the resins against aging phenomena. A defect of most of these stabilizers has been a tendency for the compounds themselves to become discolored under exposure, or to fail to prevent, and in some cases actually to promote, the discoloration of the resins. Likewise, entirely satisfactory stabilizers for the chlorinated, hydrochlorinated and chlorinated-hydrochlorinated natural and synthetic rubbers have not yet been provided.

Accordingly, it is an object of this invention to provide efficient stabilizers for the chlorine-containing resins.

Another object is to provide such stabilizers which will be highly effective in chlorinated, hydrochlorinated, and chlorinated-hydrochlorinated natural and synthetic rubbers.

A further object is to provide such stabilizers which will not cause discoloration of the resins in which they are incorporated, and which will not themselves become discolored, upon exposure to light.

SYNOPSIS OF THE INVENTION

The above and other objects are secured, in accordance with this invention, by the incorporation, into the chlorine-containing resins to be stabilized, of organic isonitroso compounds having the formula

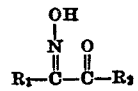 (A)

in which formula $R_1$ represents a hydrogen atom, or an organic group, which organic group may optionally form together with the group represented by $R_2$, an organic cyclic structure, and $R_2$ represents a hydrogen atom, or an organic group, which organic group may optionally form, together with the group represented by $R_1$, an organic cyclic structure. Provided, that if $R_1$ is a hydrogen atom, $R_2$ may not be a hydrogen atom, and vice versa, if $R_2$ is a hydrogen atom, $R_1$ may not be a hydrogen atom.

Resins stabilized in accordance with this invention exhibit a high and very satisfactory degree of stability against deterioration by light. The stabilizers neither become discolored themselves, nor do they permit or promote discoloration of the chlorine containing resins into which they are incorporated.

THE ISONITROSO COMPOUNDS

Describing the invention now in greater detail, and referring first to the isonitroso compounds above outlined as being suitable for the practice of this invention, these are set forth in Formula A. Under the notation of that formula, $R_1$ and $R_2$ need not be, and commonly are not identical; for instance, $R_1$ may be a hexyl group and $R_2$ may be hydrogen or a methyl group. It is noted that compounds are excluded in which both $R_1$ and $R_2$ are hydrogen atoms, since these compounds would present difficulties of synthesis. When $R_1$ or $R_2$ is a hydrocarbon radicle, it will ordinarily be simple hydrocarbon in nature, aliphatic, cycloaliphatic, aromatic or araliphatic, examples being methyl, ethyl, n-butyl, n-hexyl, 2-ethyl-hexyl-octyl, dodecyl, octodecyl, octodecenyl and like alkyl and alkenyl groups; cyclo alkyl and alkenyl groups such as cyclohexyl, abietinyl, etc.; and aromatic and aralkyl groups such as phenyl, xylenyl, α- and β-naphthyl, benzyl and the like. In general, neither of the groups represented by $R_1$ and $R_2$ should contain more than about 22 carbon atoms. As noted, the radicles $R_1$ and $R_2$ may be fused together to provide, with the —CO—CNOH— group, a cyclic structure. $R_1$ and $R_2$, instead of being simple hydrocarbon, may contain various stable inert structures such as oxygen linkages, carboxylic ester linkages, keto groups and the like. Specific examples of these compounds include, for instance

Table I

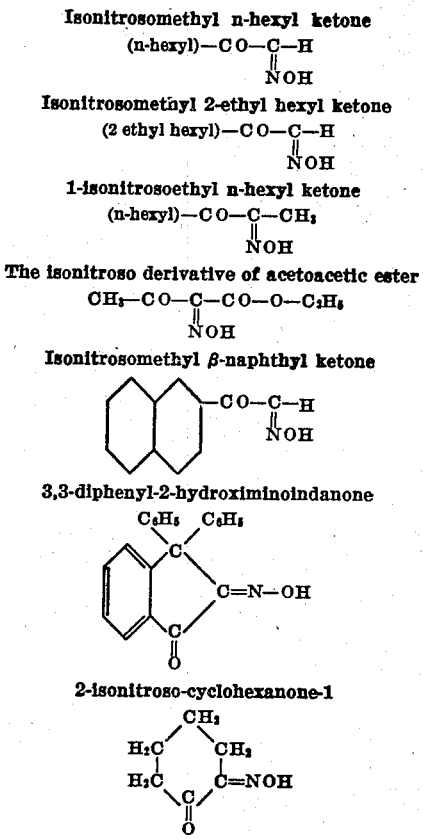

and the like.

The general method of synthesis of the isonitroso compounds involves reacting alkyl nitrites with ketones either under acid conditions (Blatt, "Organic Synthesis," Jno. Wiley and Son, Inc. p. 363) or under alkaline conditions (Koelsch and LeClaire, J. Org. Chem. 6:526).

THE CHLORINE-CONTAINING RESINS

Referring next to the chlorine containing resins which may be stabilized in accordance with this invention, these may be any of the resins comprising macromolecular straight carbon chain molecules having chlorine atoms attached thereto at intervals therealong, examples of such resins being the chlorinated, hydrochlorinated and chlorinated-hydrochlorinated natural and synthetic rubbers, which resins, on account of their special interest in connection with this invention, will be separately discussed hereinbelow. Resins which likewise may be stabilized in accordance with this invention include the polymers of vinyl chloride and copolymers thereof with minor proportions (say up to 45%) of other unsaturated compounds copolymerizable therewith such as the other vinyl halides, vinyl bromide and vinyl fluoride; vinyl esters such as vinyl formate, vinyl acetate, vinyl chloroacetate, vinyl benzoate, vinyl ethyl sulfonate; vinyl ethers and thioethers such as vinyl ethyl ether, vinyl ethyl sulfide, vinyl β-chloroethyl ether, vinyl decyl ether, and vinyl phenyl ether; vinyl ketones such as vinyl ethyl ketone, vinyl octyl ketone and vinyl phenyl ketone; vinyl carbazole; vinyl aromatic compounds such as styrene, nuclearly chlorinated styrenes, vinyl naphthalenes, etc.; acrylic derivatives such as ethyl acrylate, methyl methacrylate, ethyl chloroacrylate, acrylonitrile methacrylonitrile, etc.; vinylidene compounds such as vinylidene chloride, bromide, fluoride and acetate; miscellaneous unsaturated compounds such as coumarone, indene, etc.; olefines such as ethylene, isobutylene, etc.; and conjugated di-unsaturated compounds such as butadiene, isoprene, piperylene, 2,3-dimethylbutadiene-1,3, chloroprene and the like. For a more complete catalog of unsaturated compounds copolymerizable with vinyl chloride, reference is made to Krczil "Kurzes Handbuch der Polymerizations — Technik - II- Mehrstoff - Polymerisation" Edwards Brothers, Inc., 1945 pp. 735–737, the items under "vinylchlorid." Likewise, the polymers of vinylidene chloride and copolymers thereof with the same type of unsaturated compounds above indicated as suitable for copolymerization with vinyl chloride (with the logical exception of vinylidene chloride itself) may also be stabilized by the addition of the stabilizers of this invention. Other chlorine containing resins which may be stabilized by the addition of the stabilizers of this invention include products produced by chlorination of the polymers and copolymers of vinyl chloride and of vinylidene chloride above set forth; and the chlorinated polyethylene resins.

Further with regard to the chlorinated, hydrochlorinated and chlorinated-hydrochlorinated natural and synthetic rubbers, it is well known that natural rubber may be chlorinated to yield the well known commercial products such as "Parlon" and "Duron" (trade names respectively of the Hercules Powder Company and The Firestone Tire & Rubber Company) and are manufactured by introducing chlorine into solutions of natural rubber. The chlorine adds on at the double bonds, and to some extend replaces hydrogen, in the rubber molecule. Usually sufficient chlorine is used (approximately 66%, based on the weight of product) to completely saturate the rubber; however, it has been discovered that suitable and stable products can be made by the introduction of approximately 56% chlorine, and it is to be understood that such stable incompletely chlorinated rubbers may likewise be stabilized by the practice of this invention. Hydrochlorinated rubbers are made by introducing hydrogen chloride into solutions of natural rubber, the hydrogen chloride adding on at the double bonds in the rubber molecule. Chlorine-containing rubber derivatives intermediate between the chlorinated and hydrochlorinated rubbers may be prepared by initially hydrochlorinating rubbers up to a certain point, and thereafter completing the saturation of the rubber with chlorine. It has likewise been found that the recently introduced synthetic rubber-like polymers of conjugated unsaturated compounds such as butadiene, isoprene, 2,3-dimethylbutadiene, piperylene, chloroprene, etc., and copolymers of these compounds with minor proportions (say up to 45% based on the total weight of the total material being polymerized) of the various compounds above indicated as copolymerizable with vinyl chloride are susceptible to the chlorination and hydrochlorination procedures, to yield products generally similar to the natural rubber derivatives. An exception may be noted in the case of chloroprene polymers, which do not hydrochlorinate readily. In place of chlorinated rubber, there may be employed chlorination products of other natural rubber-like products such as gutta percha, balata, guayule rubber, chilte gum and the like. All of these products may be stabilized in accordance with this invention, which stabilization is highly desirable, since all of these materials have properties of solubility, strength, etc. strongly recommending them for applications which will entail severe conditions of exposure to light—i. e., surface coatings, wrapping and other films, coated fabrics and the like.

THE AMOUNT OF STABILIZER TO BE EMPLOYED

The amount of stabilizer to be employed will vary considerably with the sensitivity of the particular chlorine-containing resin to deterioration by light and with the severity and duration of the proposed exposure of the resin. In general, quantities as low as 0.1%, on the basis of weight of chlorine-containing resin, will impart a substantial degree of stability thereto. Usually there will be employed from about 1.0% to about 4.0%, on the same basis. Quantities greater than 5.0% will provide only a diminishingly increased degree of stability and will ordinarily be found uneconomic.

With the foregoing general discussion in mind, there are given herewith detailed examples of the practice of this invention. All parts given are by weight.

*Test formulation*

Chlorine-containing resin
  (types as indicated in
  Table II) _____ 100 parts
Di octyl phthalate _____ 30 parts Nitroso compound Stabilizer (types as indicated
  in Table II) _____ 0, 0.5, 2.0 or 5.0 parts
                            (per Table II)
Methyl ethyl ketone _____ 567 parts

*Resins stabilized*

"CPB"—a chlorinated polybutadiene containing 64% of chlorine.

Chloro Buna S—a chlorinated copolymer of 75% butadiene, 25% styrene. Product contains 62% chlorine.

"CPI"—a chlorinated synthetic polyisoprene containing 65% chlorine.

"Parlon"—a chlorinated rubber manufactured by the Hercules Powder Company.

"Pliofilm"—the resin extracted from a film sold under that name by the Goodyear Tire & Rubber Company.

"Vinylite VYNW"—a copolymer of 85% vinyl chloride, 15% vinyl acetate manufactured by the Carbon and Carbide Chemicals Corporation.

"Geon 202"—a copolymer of 85% vinyl chloride, 15% vinylidene chloride manufactured by the B. F. Goodrich Co.

*Stabilizers tested*

Listed above in Table I.

A series of films was made up in accordance with the above test formula, using the various resins and stabilizers in combinations and proportions as indicated hereinbelow in Table II. In the case of each film, the selected resin, the dioctyl phthalate, the selected stabilizer (in the proportion 0.3, 1.0, etc. parts selected for that film) and the methyl ethyl ketone were agitated together to form a smooth cement. This cement was cast to a depth of .01" on a glass plate, dried in an oven at 100° C. for one hour, and stripped off the plate to yield a free film usually on the order of .001" thick. This film was placed under a General Electric Company "S-1" sun lamp at a distance of 10" therebelow, and exposed to the rays of the lamp. The length of time in hours required to render the film too brittle for handling was noted, and is recorded in Table II as the stability of the film. Any discoloration of the film was evaluated qualitatively by the operator and is also recorded in Table II. Herewith in Table II are recorded the formulations of the various films, together with test data secured thereon as above described.

*Table II*

| Constituents of Film | | Film Test Results | | | | | |
|---|---|---|---|---|---|---|---|
| | | Hours Stability with Following Parts of Stabilizer per 100 Parts Resin | | | | Final Film Appearance with Following Parts of Stabilizer per 100 parts Resin | |
| Resin | Stabilizer | 0 | 0.5 | 2.0 | 5.0 | 0 | 2.0 Parts |
| C. P. B. | isonitroso n-hexyl ketone | 90 | 180 | 200 | 190 | brown-yellow | slightly yellow. |
| | isonitroso compound of acetoacetic ester | | 180 | 200 | 210 | | Do. |
| | isonitroso β-naphthyl ketone | | 180 | 200 | 200 | | no color. |
| | 3,3 diphenyl-2-hydroximono indanone | | 180 | 200 | 200 | | slightly yellow. |
| Chloro Buna S | isonitroso n-hexyl ketone | 42 | 80 | 80 | 100 | brown-yellow | light-yellow. |
| | isonitroso compound of acetoacetic ester | | | 80 | 90 | | Do. |
| | isonitroso β-naphthyl ketone | | | 90 | | | Do. |
| | 3,3 diphenyl-2-hydroximonoindanone | | | 80 | | | yellow. |
| Parlon | isonitroso n-hexyl ketone | 100 | | 150 | 150 | brown | light-yellow. |
| | isonitroso compound of acetoacetic ester | | | 150 | | | Do. |
| | isonitroso β-naphthyl ketone | | | 150 | | | straw. |
| Pliofilm | isonitroso n-hexyl ketone | 40 | | 70 | | brown | light-yellow. |
| | isonitroso compound of acetoacetic ester | | | 80 | | | light straw. |
| C. P. I. | isonitroso n-hexyl ketone | 50 | | 80 | | brown | light-yellow. |
| Vinylite VYNW | isonitroso n-hexyl ketone | 100 | | 190 | | black | light straw. |
| Geon 202 | isonitroso n-hexyl ketone | 120 | | 190 | | do | Do. |

From the foregoing general discussion and detailed example, it will be evident that this invention provides novel, highly stable, compositions of chlorine-containing resins. The stabilizing agents employed are cheaply and readily procurable from reliable domestic sources. The stabilized products remain free from any great degree of discoloration up until the time of their mechanical failure.

What is claimed is:

1. A light-stable composition comprising a resin composed of macromolecular straight carbon chains having chlorine atoms attached thereto at intervals therealong, together with a stabilizing amount of a compound having the formula:

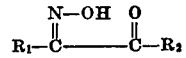

in which formula $R_1$ represents a substituent selected from the class consisting of the hydrogen atom, hydrocarbon groups, and hydrocarbon groups forming, with the group represented by $R_2$, hydrocarbon cyclic structures, and $R_2$ represents a substituent selected from the class consisting of the hydrogen atom, hydrocarbon groups, and hydrocarbon groups forming, with the group represented by $R_1$, hydrocarbon cyclic structures, with the proviso, that only one of $R_1$ and $R_2$ may be a hydrogen atom.

2. A light-stable composition comprising a resin composed of macromolecular straight carbon chains having chlorine atoms attached thereto at intervals therealong, together with a stabilizing amount of isonitrosomethyl-n-hexyl ketone.

3. A light-stable composition comprising chlorinated polybutadiene together with a stabilizing amount of isonitrosomethyl-n-hexyl ketone.

4. A light-stable composition comprising a resin composed of macromolecular straight carbon chains having chlorine atoms attached thereto at intervals therealong, together with a stabilizing amount of the isonitroso compound of acetoacetic ester.

5. A light-stable composition comprising chlorinated polybutadiene together with a stabilizing amount of the isonitroso compound of acetoacetic ester.

6. A light-stable composition comprising a resin composed of macromolecular straight carbon chains having chlorine atoms attached thereto at intervals therealong, together with a stabilizing amount of isonitrosomethyl β-naphthyl ketone.

7. A light-stable compound comprising chlorinated rubber together with a stabilizing amount of isonitrosomethyl β-naphthyl ketone.

8. A light-stable compound comprising chlorinated polybutadiene, together with a stabilizing amount of a compound having the formula:

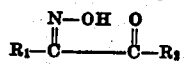

in which formula $R_1$ represents a substituent selected from the class consisting of the hydrogen atom, hydrocarbon groups, and hydrocarbon groups forming, with the group represented by $R_2$, hydrocarbon cyclic structures, and $R_2$ represents a substituent selected from the class consisting of the hydrogen atom, hydrocarbon groups, and hydrocarbon groups forming, with the group represented by $R_1$, hydrocarbon cyclic structures, with the proviso, that only one of $R_1$ and $R_2$ may be a hydrogen atom.

9. A light-stable composition comprising chlorinated rubber, together with a stabilizing amount of a compound having the formula:

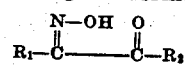

in which formula $R_1$ represents a substituent selected from the class consisting of the hydrogen atom, hydrocarbon groups, and hydrocarbon groups forming, with the group represented by $R_2$, hydrocarbon cyclic structures, and $R_2$ represents a substituent selected from the class consisting of the hydrogen atom, hydrocarbon groups, and hydrocarbon groups forming, with the group represented by $R_1$, hydrocarbon cyclic structures, with the proviso, that only one of $R_1$ and $R_2$ may be a hydrogen atom.

CLAIRE D. LE CLAIRE.

No references cited.